United States Patent
Ohmori et al.

(10) Patent No.: US 10,384,629 B2
(45) Date of Patent: Aug. 20, 2019

(54) COLLISION AVOIDANCE DEVICE

(71) Applicants: ADVICS CO., LTD., Kariya-shi (JP); TOYOTA JIDOSHA KABUSHIKI KAISHA, Toyota-shi (JP)

(72) Inventors: Yosuke Ohmori, Kariya (JP); Wataru Ike, Nagoya (JP)

(73) Assignees: ADVICS CO., LTD., Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 259 days.

(21) Appl. No.: 15/529,557

(22) PCT Filed: Nov. 27, 2015

(86) PCT No.: PCT/JP2015/083506
§ 371 (c)(1),
(2) Date: May 25, 2017

(87) PCT Pub. No.: WO2016/084967
PCT Pub. Date: Jun. 2, 2016

(65) Prior Publication Data
US 2017/0341612 A1 Nov. 30, 2017

(30) Foreign Application Priority Data
Nov. 28, 2014 (JP) ................ 2014-242294

(51) Int. Cl.
*B64C 39/02* (2006.01)
*B60R 21/0134* (2006.01)
(Continued)

(52) U.S. Cl.
CPC ............ *B60R 21/0134* (2013.01); *B60T 7/12* (2013.01); *B60T 7/22* (2013.01); *B60W 10/06* (2013.01);
(Continued)

(58) Field of Classification Search
CPC combination set(s) only.
See application file for complete search history.

(56) References Cited

U.S. PATENT DOCUMENTS 4,073,359 A * 2/1978 Fujiki ................ B60K 31/0008
180/169
6,016,543 A * 1/2000 Suzuki ................ G06F 9/30167
712/216
(Continued)

FOREIGN PATENT DOCUMENTS

JP 55-15337 B2 4/1980
JP 5-39011 A 2/1993
(Continued)

OTHER PUBLICATIONS

Extended Search Report dated Dec. 11, 2017 in European Patent Application No. 15863734.8.
(Continued)

*Primary Examiner* — Redhwan K Mawari
(74) *Attorney, Agent, or Firm* — Oblon, McClelland, Maier & Neustadt, L.L.P.

(57) ABSTRACT

A collision avoidance device includes a collision avoidance executor, a determiner, and a collision avoidance controller, for example. The collision avoidance executor can execute a collision avoidance function for a vehicle to avoid collision with an object to be avoided. The determiner determines, based on an operation of an accelerator pedal by a driver, whether the driver has an intention of acceleration. The collision avoidance controller inhibits execution of the collision avoidance function when the driver is determined to have the intention of acceleration. The determiner further determines, based on the operation of the accelerator pedal, whether the driver has an intention of cancelation of the collision avoidance function. The collision avoidance controller ends the execution of the collision avoidance function when the driver is determined to have the intention of cancelation during the execution of the collision avoidance function.

7 Claims, 8 Drawing Sheets

(51) Int. Cl.
    *B60W 50/12*           (2012.01)
    *B60T 7/12*            (2006.01)
    *B60W 30/09*          (2012.01)
    *G08G 1/16*           (2006.01)
    *B60W 50/10*          (2012.01)
    *B60T 7/22*            (2006.01)
    *B60W 10/06*          (2006.01)
    *B60W 10/08*          (2006.01)
    *B60W 10/184*        (2012.01)
    *B60W 30/18*          (2012.01)
    *B60W 50/14*          (2012.01)

(52) U.S. Cl.
    CPC .......... *B60W 10/08* (2013.01); *B60W 10/184* (2013.01); *B60W 30/09* (2013.01); *B60W 30/18163* (2013.01); *B60W 50/10* (2013.01); *B60W 50/12* (2013.01); *G08G 1/16* (2013.01); *B60T 2201/022* (2013.01); *B60T 2220/00* (2013.01); *B60T 2270/89* (2013.01); *B60W 2050/143* (2013.01); *B60W 2540/103* (2013.01); *B60W 2540/106* (2013.01); *B60W 2540/12* (2013.01); *B60W 2550/10* (2013.01)

(56) References Cited

U.S. PATENT DOCUMENTS

| | | | | |
|---|---|---|---|---|
| 8,942,904 B2 * | 1/2015 | Foerster | .................... | B60T 7/22 180/282 |
| 9,469,298 B2 * | 10/2016 | Hayasaka | ............. | B60W 30/09 |
| 9,487,195 B2 * | 11/2016 | Fujishiro | ............... | B60W 10/18 |
| 2013/0211661 A1 * | 8/2013 | Kirsch | .................. | G06F 11/008 701/30.3 |
| 2013/0211687 A1 * | 8/2013 | Trost | ......................... | B60T 7/22 701/70 |
| 2015/0151755 A1 * | 6/2015 | Ohmori | ..................... | B60T 7/22 701/93 |
| 2015/0232073 A1 * | 8/2015 | Fujishiro | .................. | B60T 7/22 701/70 |

FOREIGN PATENT DOCUMENTS

| | | |
|---|---|---|
| JP | 7-251724 A | 10/1995 |
| JP | 2005-53384 A | 3/2005 |
| JP | 2005-82041 A | 3/2005 |
| JP | 2005-254857 A | 9/2005 |
| JP | 2006-117188 A | 5/2006 |
| JP | 2009-298171 A | 12/2009 |
| JP | 2010-188899 A | 9/2010 |
| JP | 2012-121534 A | 6/2012 |
| JP | 2012-224119 A | 11/2012 |
| WO | 2014/122724 A1 | 8/2014 |

OTHER PUBLICATIONS

International Search Report dated Feb. 16, 2016 in PCT/JP2015/083506 filed Nov. 27, 2015.

\* cited by examiner

COLLISION AVOIDANCE DEVICE

CROSS-REFERENCE TO RELATED APPLICATIONS

This application is national stage application of International Application No. PCT/JP2015/083506, filed Nov. 27, 2015, which designates the United States, and claims the benefit of priority from Japanese Patent Application No. 2014-242294, filed Nov. 28, 2014. The entire contents of each of the above applications are hereby incorporated by reference herein in entirety.

TECHNICAL FIELD

The present invention relates to a collision avoidance device.

BACKGROUND ART

In recent years, collision avoidance devices have been known which apply a brake to a vehicle by automatic braking, for example, to avoid colliding with a preceding vehicle ahead in traveling direction when an inter-vehicle distance to the preceding vehicle decreases to a certain distance or below.

CITATION LIST

Patent Literature

Patent Document 1: Japanese Examined Patent Publication No. S55-015337
Patent Document 2: Japanese Patent Application Laid-open Publication No. 2005-254857

SUMMARY OF INVENTION

Problem to be Solved by the Invention

In such a conventional collision avoidance device, a driver may step on an accelerator pedal and accelerates the vehicle in order to overtake the preceding vehicle. In such cases, a shortened inter-vehicle distance to the preceding vehicle triggers avoidance braking control of the vehicle, which makes it difficult for the driver to overtake the preceding vehicle as intended.

Thus, it is an object of the present invention to provide a collision avoidance device that allows the driver of a vehicle including a collision avoidance function to overtake a preceding vehicle according to his or her intention.

Means for Solving Problem

A collision avoidance device according the present invention comprises, for example, a collision avoidance executor that can execute a collision avoidance function for a vehicle to avoid collision with an object to be avoided; a determiner that determines, based on an operation of an accelerator pedal by a driver, whether the driver has an intention of acceleration; and a collision avoidance controller that inhibits execution of the collision avoidance function when the driver is determined to have the intention of acceleration.

In the collision avoidance device, the determiner determines that the driver has the intention of acceleration, when a stroke of the accelerator pedal is equal to or greater than a first threshold.

In the collision avoidance device, the determiner further determines, based on the operation of the accelerator pedal, whether the driver has an intention of cancelation of the collision avoidance function, and the collision avoidance controller ends the execution of the collision avoidance function when the driver is determined to have the intention of cancelation during the execution of the collision avoidance function.

In the collision avoidance device, the determiner determines that the driver has the intention of cancelation when the stroke of the accelerator is equal to or greater than a second threshold, when two or more depressions are detected within a certain period of time, or when a depression speed of the accelerator pedal is equal to or greater than a speed threshold.

In the collision avoidance device, the collision avoidance controller refrains from ending the execution of the collision avoidance function from a start of the execution of the collision avoidance function to a stop of rising of a deceleration.

In the collision avoidance device, the collision avoidance controller ends the execution of the collision avoidance function when the stroke of the accelerator pedal batches or exceeds a third threshold from the start of the execution of the collision avoidance function to the stop of the rising of the deceleration, the third threshold being for determining an accidental depression of the accelerator pedal.

In the collision avoidance device, the collision avoidance controller refrains from inhibiting or ending the execution of the collision avoidance function during execution of an acceleration limiting function, regardless of the operation of the accelerator pedal, the acceleration limiting function being for limiting a vehicle speed to a certain upper limit speed or upper limit acceleration or below.

In the collision avoidance device, the collision avoidance controller refrains from inhibiting or ending the execution of the collision avoidance function regardless of the operation of the accelerator pedal, when simultaneous operations of a brake pedal and the accelerator pedal are detected.

DESCRIPTION OF EMBODIMENT

An exemplary embodiment of the present invention will be disclosed below. Configurations of the embodiment to be given below and operations and results (effects) provided by the configurations are merely examples. The present invention can also be carried out with other configurations than those disclosed in the following embodiment. The present invention can attain at least one of the various effects (including derivative effects) obtained by the configurations.

Figure 1:
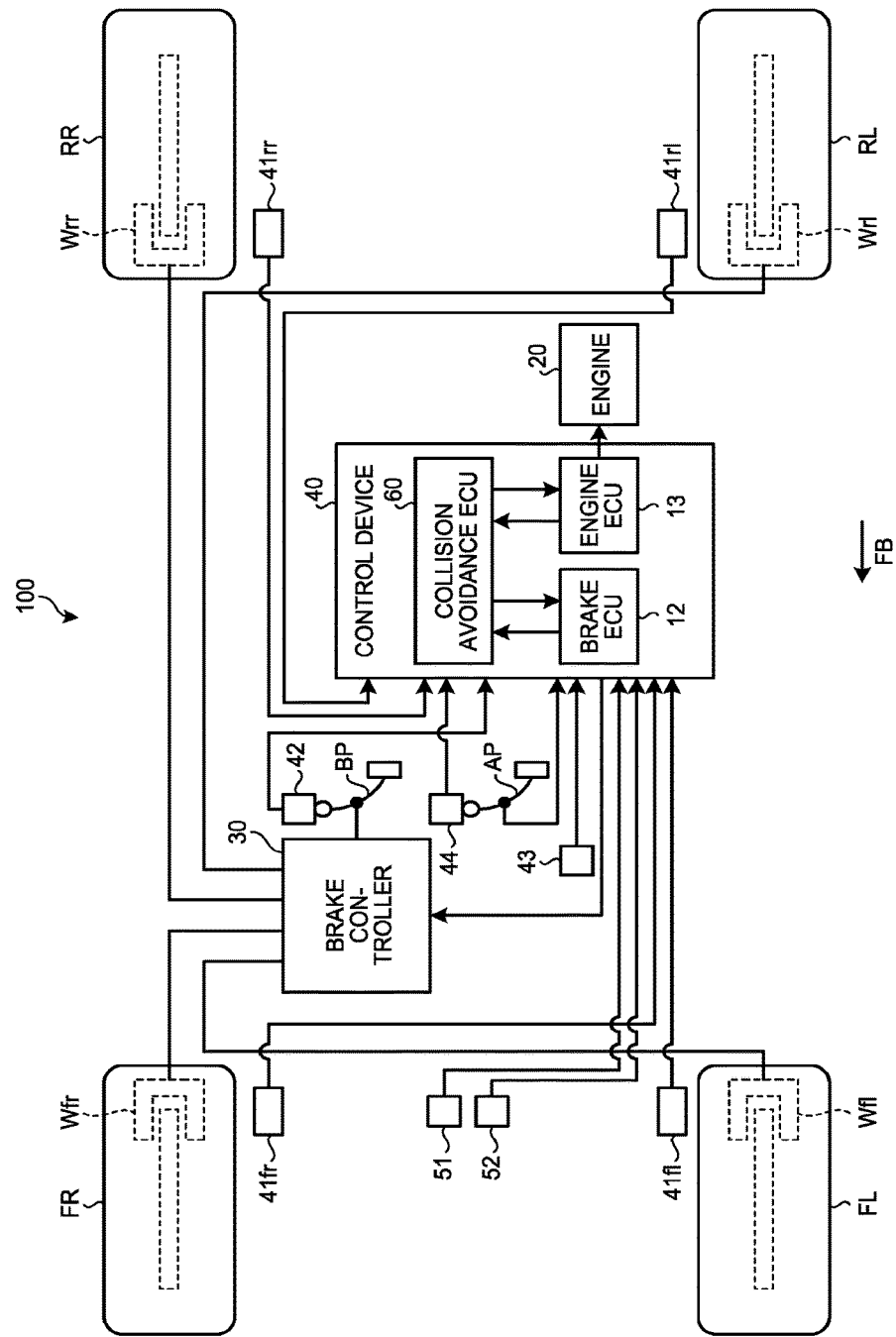
FIG. 1 is a schematic diagram illustrating an exemplary configuration of a vehicle according to an embodiment of the present invention.

FIG. 1 is a schematic diagram illustrating an exemplary configuration of a vehicle according to the embodiment. In the present embodiment, a vehicle 100 may be, for example, an automobile (internal combustion engined automobile) using an internal combustion engine (engine 20) as a driving source, an automobile (such as an electric vehicle or a fuel-cell vehicle) using an electric motor (motor, which is not illustrated) as the driving source, or an automobile (hybrid automobile) using both an internal combustion engine and an electric motor as driving sources. The vehicle 100 can be equipped with various types of transmissions and various types of devices (such as systems and components) needed for driving the internal combustion engine or the electric motor. For example, systems, numbers, and layouts of devices for driving wheels on the vehicle can be variously set. In the present embodiment, as an example, the vehicle 100 is a four-wheel vehicle (four-wheel automobile), and includes two left and right front wheels FL and FR and two left and right rear wheels RL and RR. The front side in a vehicle front-rear direction (arrow FB) corresponds to the left side in FIG. 1.

As illustrated in FIG. 1, the vehicle 100 of the present embodiment includes an engine 20, a brake controller 30, an imaging device 51, a radar 52, a brake switch 42, an accelerator pedal stroke sensor 44, a front-rear directional acceleration sensor 43, and a control device 40.

The vehicle 100 also includes wheel cylinders Wfr and Wfl and wheel speed sensors 41fr and 41fl corresponding to the two front wheels FR and FL, respectively, and includes wheel cylinders Wrr and Wrl and wheel speed sensors 41rr and 41rl corresponding to the two rear wheels RR and RL, respectively. Hereinafter, the wheel speed sensors 41fr, 41fl, 41rr, and 41rl may be collectively referred to as wheel speed sensors 41, and the wheel cylinders Wfr, Wfl, Wrr, and Wrl may be collectively referred to as wheel cylinders W.

Although the vehicle 100 includes basic components as the vehicle 100 in addition to the components illustrated in FIG. 1, description will herein be given of only relevant configurations of the vehicle 100 and control over the configurations.

The imaging device 51 is, for example, a digital camera incorporating an image pickup device, such as a charge-coupled device (CCD) or a complementary metal-oxide semiconductor (CMOS) image sensor (CIS). The imaging device 51 can output image data (moving image data or frame data) at a certain frame rate. In the present embodiment, the imaging device 51 is located at a front-side end (end in a plan view) (front side in the vehicle front-rear direction) of a vehicle body (not illustrated), and can be provided, for example, on a front bumper. The imaging device 51 outputs image data including an object to be avoided, such as a preceding vehicle 501 ahead of the vehicle 100 (refer to FIG. 4). The image data is an example of data from which the object to be avoided is to be detected.

The radar 52 is, for example, a millimeter-wave radar. The radar 52 can output, for example, distance data indicating the distance (separation or detected distance (refer to FIG. 4)) to the object to be avoided such as the preceding vehicle 501, and velocity data indicating relative speed (velocity) to the object to be avoided. The control device 40 updates results of measuring the distance by the radar 52 between the vehicle 100 and the object to be avoided as the preceding vehicle 501, and stores the updated results in a storage at appropriate times (for example, at certain time intervals). The updated distance measurements can be used for calculation.

Each of the wheel speed sensors 41 outputs a pulse signal upon every rotation of the corresponding wheel by a certain angle.

The accelerator pedal stroke sensor 44 is provided for an accelerator pedal AP to detect the stroke of the accelerator pedal AP by the driver. The brake switch 42 is provided for a brake pedal BP to output a brake operation signal indicating operation or non-operation to the brake pedal BP by the driver. Specifically, the brake switch 42 outputs an ON (High) brake operation signal when the brake pedal BP is operated, and outputs an OFF (Low) brake operation signal when the brake pedal BP is not operated.

The front-rear directional acceleration sensor 43 detects the acceleration of the vehicle body in the front-rear direction (front-rear acceleration), and outputs a signal representing a front-rear acceleration Gx.

The engine 20 outputs power in accordance with the operation of the accelerator pedal AP by the driver. In response to a command from a brake electronic control unit (ECU) 12, the brake controller 30 controls the wheels FR, FL, RR, and RL to generate braking forces with brake fluid pressure. The brake controller 30 produces the brake fluid pressure corresponding to an operating force applied to the brake pedal BP, and can adjust the supply of the brake fluid pressure to the wheel cylinders Wfr, Wfl, Wrr, and Wrl disposed for the wheels FR, FL, RR, and RL, respectively.

The control device 40 receives signals and data from the respective elements of the vehicle 100 to control them. As illustrated in FIG. 1, the control device 40 mainly includes a collision avoidance electronic control unit (ECU) 60, the brake ECU 12, and an engine ECU 13. In the present embodiment, the control device 40 is an example of a collision avoidance device.

The engine ECU 13 handles various types of control of the engine 20, including fuel injection control and air-intake adjustment control.

The brake ECU 12 handles, for example, braking torque adjustment control over the vehicle and each of the wheels FR, FL, RR, and RL. The brake ECU 12 calculates, for example, the vehicle-body speed of the vehicle based on a detection signal from at least one of the wheel speed sensors 41 provided for the respective wheels FR, FL, RR, and RL, and the deceleration of the vehicle based on a detection signal from the front-rear directional acceleration sensor 43, and transmits the resultants to the other ECUs. The deceleration as calculated herein exhibits a positive value while the vehicle is decelerating and exhibits a negative value while the vehicle is accelerating.

The brake ECU 12 performs an acceleration limiting function to limit the vehicle-body speed to a certain upper limit speed or below or to limit the vehicle-body acceleration to a certain upper limit acceleration or below. The acceleration limiting function is also called an active speed limiter (ASL). At the start of the acceleration limiting function, the brake ECU 12 notifies the collision avoidance ECU 60 of the execution of the acceleration limiting function. At the end of the acceleration limiting function, the brake ECU 12 notifies the collision avoidance ECU 60 of the completion of the acceleration limiting function. Upon receiving the start of the acceleration limiting function from the brake ECU 12, the collision avoidance ECU 60 sets an execution flag of the acceleration limiting function to ON, and stores it in a storage 65. Upon receiving the completion of the acceleration limiting function from the brake ECU 12, the collision avoidance ECU 60 sets the execution flag of the acceleration limiting function to OFF in the storage 65.

The collision avoidance ECU 60 controls a collision avoidance function to execute. The details of the collision avoidance ECU 60 will be described later. Each of the ECUs is configured as a computer, and includes an arithmetic processor (not illustrated) such as a central processing unit (CPU), and a storage (storage 65 in the collision avoidance ECU 60) including a read-only memory (ROM), a random access memory (RAM), or a flash memory.

The arithmetic processor reads a program stored (installed) in a nonvolatile storage (such as a ROM or a flash memory), executes calculations according to the program, and serves as each of the ECUs. In particular, the collision avoidance ECU 60 functions (operates) as the respective elements illustrated in FIG. 2 (to be described later). The storage can store, for example, data (such as tables (data groups) and functions) used in various calculations for the controls, and results of calculations (including values under calculation).

The configuration of the vehicle 100 described above is merely an example, and can be modified in various forms. Known devices can be used as the individual units of the vehicle 100. The elements of the vehicle 100 can be shared with each other. The vehicle 100 can include a sonar to detect the object to be avoided.

Figure 2:
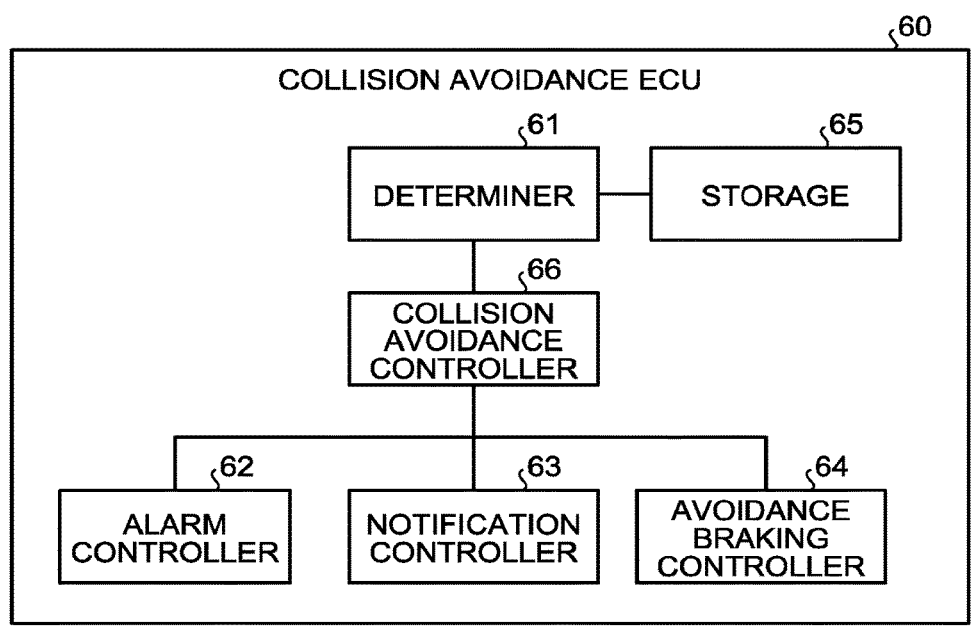
FIG. 2 is a block diagram illustrating an exemplary functional configuration of a collision avoidance electronic control unit (ECU) according to the embodiment.

The following describes the details of the collision avoidance ECU 60. FIG. 2 is a block diagram illustrating an exemplary functional configuration of the collision avoidance ECU 60 according to the present embodiment. The collision avoidance ECU 60 of the present embodiment can function (operate) as a determiner 61, a collision avoidance controller 66, an alarm controller 62, a notification controller 63, and an avoidance braking controller 64, as illustrated in FIG. 2, through cooperation between hardware and software (program). That is, the program can include modules corresponding to the blocks excluding the storage 65, illustrated in FIG. 2, as an example. The alarm controller 62, the notification controller 63, and the avoidance braking controller 64 are examples of a collision avoidance executor. The storage 65 stores, for example, various thresholds, a reference time T1, and various flags (to be described later).

The collision avoidance controller 66 controls execution of the collision avoidance function. The collision avoidance function is a function to maintain a certain relative distance between the preceding vehicle as the object to be avoided and the vehicle so as to avoid collision with the preceding vehicle. The collision avoidance function specifically includes avoidance braking, notifying, and alarming. The avoidance braking is also called automatic braking to apply a brake to the vehicle 100 with the brake ECU 12 and the brake controller 30 to maintain the relative distance between the preceding vehicle and the vehicle 100. The notifying is outputs of sound from a speaker (not illustrated) provided, for example, ahead of the driver's seat, indicating that the avoidance braking is to be activated. The alarming is outputs of sound from the speaker (not illustrated), urging the activation of the avoidance braking. The notifying and the alarming differ in output sound.

Figure 3:
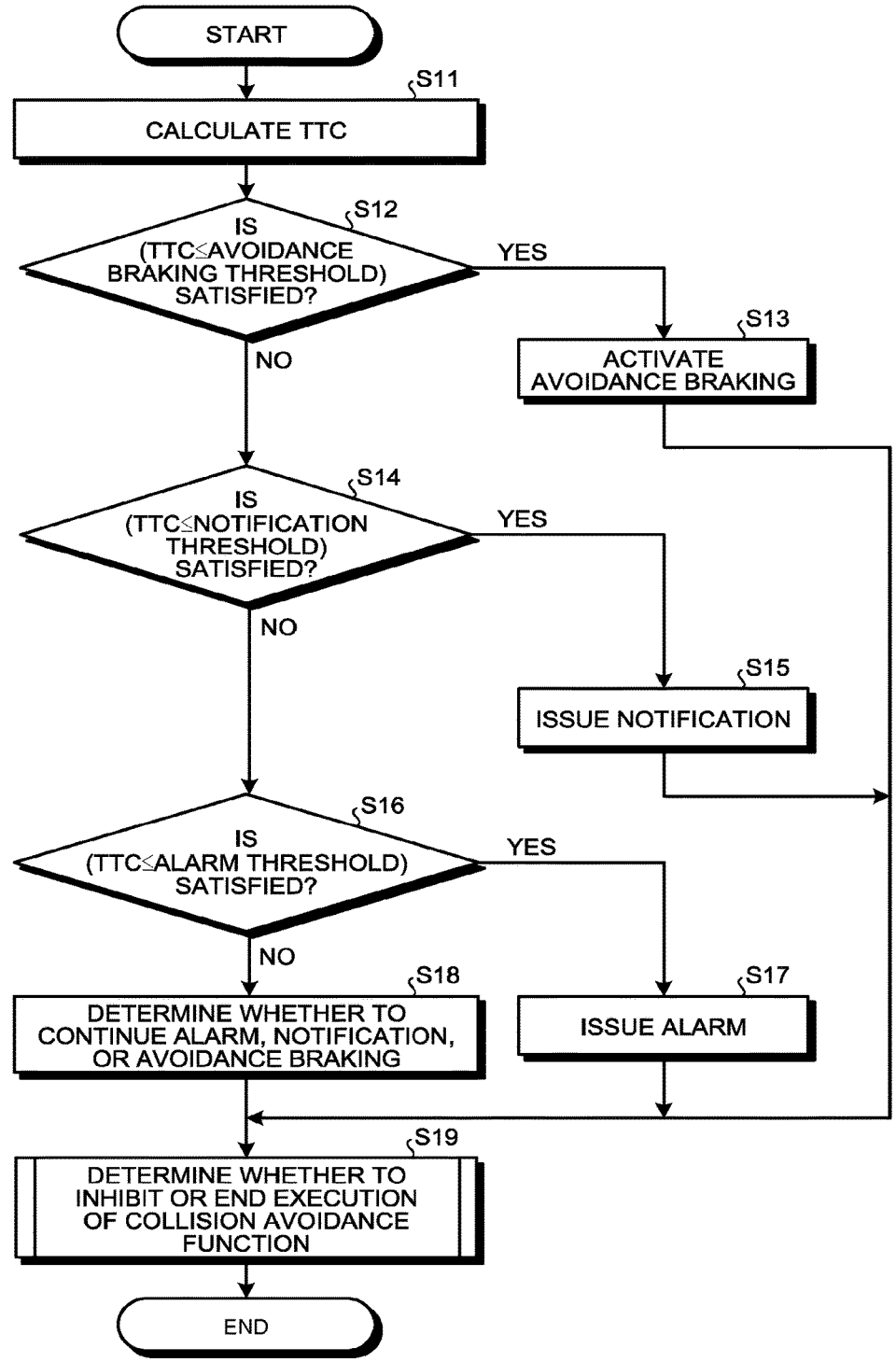
FIG. 3 is a flowchart of an exemplary procedure of execution of a collision avoidance function according to the embodiment.

Processing in each step of the collision avoidance function is performed in the following manner. FIG. 3 is a flowchart of a procedure of executing the collision avoidance function according to the present embodiment.

First, the collision avoidance controller 66 calculates a time to collision TTC as an estimated time to collision with the preceding vehicle (S11). The collision avoidance controller 66 can calculate the time to collision TTC by Expression (2) based on the following equation of motion (1).

$$\frac{1}{2}\alpha_{AB}t^2 + V_{AB}t + X_{AB} = 0 \tag{1}$$

$$t = \frac{-V_{AB} - \sqrt{V_{AB}^2 - 2\alpha_{AB}X_{AB}}}{\alpha_{AB}} \tag{2}$$

t denotes the time to collision TTC. $V_{AB}$ denotes the relative speed of the vehicle with respect to the preceding vehicle. $X_{AB}$ denotes the relative distance from the vehicle to the preceding vehicle. $\alpha_{AB}$ denotes the relative acceleration of the vehicle with respect to the preceding vehicle. The collision avoidance controller 66 can calculate $V_{AB}$ based on a result of the detection by any of the wheel speed sensors 41. The collision avoidance controller 66 can calculate $\alpha_{AB}$ based on a result of the detection by the front-rear directional acceleration sensor 43. The collision avoidance controller 66 can calculate $X_{AB}$ based on a result of the detection by the radar 52.

If the value of t or the value in the square root operator in Expression (2) is negative, the collision avoidance controller 66 calculates t as the time to collision TTC by the following expression.

$$t = X_{AB}/V_{AB}$$

Then, the collision avoidance controller 66 determines whether the time to collision TTC is equal to or smaller than a certain avoidance braking threshold (S12). When determining that the time to collision TTC is equal to or smaller than the avoidance braking threshold (Yes at S12), the collision avoidance controller 66 transmits an avoidance braking command to the avoidance braking controller 64 to activate the avoidance braking (S13). That is, upon receiving the command, the avoidance braking controller 64 instructs the brake ECU 12 to apply a brake. Thus, the brake controller 30 applies braking.

If the time to collision TTC is greater than the avoidance braking threshold (No at S12), the collision avoidance controller 66 determines whether the time to collision TTC is equal to or smaller than a certain notification threshold (S14). The notification threshold is higher than the avoidance braking threshold. Determining that the time to collision TTC is equal to or smaller than the notification threshold (Yes at S14), the collision avoidance controller 66 transmits a notification command to the notification controller 63 to issue a notification (S15). That is, the notification controller 63 outputs a message of activation of the avoidance braking from the speaker.

Determining that the time to collision TTC is greater than the notification threshold (No at S14), the collision avoidance controller 66 determines whether the time to collision TTC is equal to or smaller than a certain alarm threshold (S16). The alarm threshold is higher than the notification threshold. Determining that the time to collision TTC is equal to or smaller than the alarm threshold (Yes at S16), the collision avoidance controller 66 transmits an alarm command to the alarm controller 62 to issue an alarm (S17). That is, the alarm controller 62 outputs a message of an urgent need for the avoidance braking from the speaker.

Determining that the time to collision TTC is greater than the alarm threshold (No at S16), the collision avoidance controller 66 determines whether to continue the alarm, the notification, or the avoidance braking (step S18). The continuance determination on the alarm, the notification, or the avoidance braking is a process to determine whether to continue the control of the alarm, the notification, or the avoidance braking when the time to collision TTC is increased by, for example, a deceleration of the vehicle or an advance of the preceding vehicle.

After determining the continuance of the alarm, the notification, or the avoidance braking or after activating the alarm, the notification, or the avoidance braking, the collision avoidance controller 66 determines whether to inhibit or end the execution of the collision avoidance function (S19). This determination is a process to determine whether to inhibit or end the execution of the collision avoidance function including the alarming, the notifying, and the avoidance braking based on the operation of the accelerator pedal AP. The inhibiting or ending process of the collision avoidance function is also called an accelerator override process.

The following describes the inhibition or ending determination on the execution of the collision avoidance function.

Referring back to FIG. 2, the determiner 61 determines, from the operation of the accelerator pedal AP by the driver, whether the driver clearly intends to accelerate. Specifically, the determiner 61 receives, from the accelerator pedal stroke sensor 44, the stroke of the accelerator pedal AP detected by the accelerator pedal stroke sensor 44. The determiner 61 compares the stroke with a first threshold, and, when the stroke is equal to or greater than the first threshold, determines that the driver clearly intends to accelerate. Since the first threshold serves as a reference for determining the driver's clear intention of acceleration, the first threshold can be set to a sufficiently large value, for example, 65% of a stroke for a full throttle acceleration (that is, the maximum stroke of the accelerator pedal AP=100%). The first threshold is, however, not limited to this value.

During no avoidance braking (automatic braking), when the determiner 61 determines the driver's clear intention of acceleration, the collision avoidance controller 66 controls the relevant controllers to inhibit the execution of the collision avoidance function (alarm, notification, or avoidance braking). In this case, the collision avoidance controller 66 does not transmit an execution command to the alarm controller 62, the notification controller 63, and the avoidance braking controller 64 regardless of the value of the time to collision TTC. When activating the collision avoidance function (alarm, notification, or avoidance braking), the collision avoidance controller 66 stores, as a flag, information indicating which item of the collision avoidance function, that is, alarming, notifying, or avoidance braking is activated in the storage 65. The determiner 61 determines whether the avoidance braking is working, with reference to the flag in the storage 65.

Figure 4:
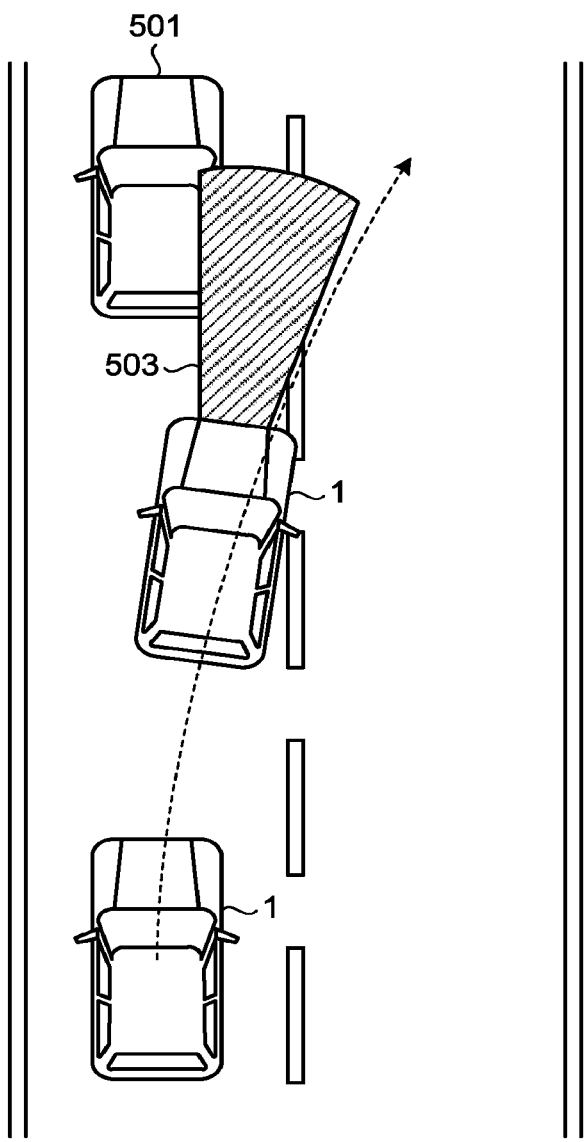
FIG. 4 is a schematic diagram illustrating an example of overtaking a preceding vehicle in the embodiment.

FIG. 4 is a schematic diagram illustrating an example of overtaking the preceding vehicle in the present embodiment. Assumed that during traveling of a vehicle 1 the driver steps on the accelerator pedal AP for acceleration, aiming to overtake or slip by the preceding vehicle 501. In this case, decreasing the inter-vehicle distance to the preceding vehicle 501 and the time to collision TTC, the vehicle 1 enters a collision unavoidable region 503 unless the collision avoidance function (alarm, notification, or avoidance braking) is activated. That is, the time to collision TTC falls to the threshold or less, which activates the collision avoidance function and hinders the vehicle 1 from overtaking or slipping by the preceding vehicle 501, contrary to the driver's intention.

Hence, in the present embodiment, when determining that the driver clearly intends to accelerate, the collision avoidance controller 66 does not activate the collision avoidance function (alarm, notification, or avoidance braking) so as to allow the vehicle 1 to overtake or slip by the preceding vehicle 501.

In the present embodiment, the stroke of the accelerator pedal AP at or above the first threshold is a reference for determining the clear intention of acceleration. However, the reference for determination of the intention of acceleration is not limited thereto.

The collision avoidance controller 66 refrains from ending the execution of the collision avoidance function until the deceleration stops rising after the start of the avoidance braking. Specifically, the collision avoidance controller 66 does not end the execution of the collision avoidance function (alarm, notification, or avoidance braking) in principle until a certain threshold time T1 elapses from the start of the avoidance braking. The threshold time T1 corresponds to a length of time from the start of the avoidance braking to the driver's additional step-on to the accelerator pedal AP due to inertia caused by the deceleration by braking. Such a time is measured in advance and stored as the threshold time T1 in the storage 65.

An operation of the accelerator pedal AP immediately after the start of the avoidance braking may be a driver's accidental step-on due to the inertia caused by the deceleration because the avoidance braking decelerates the vehicle 100. In view of this, in the present embodiment, the collision avoidance controller 66 refrains from ending the execution of the collision avoidance function until the threshold time T1 elapses from the start of the collision avoidance function, even when detecting a stroke not exceeding the maximum stroke value of the accelerator pedal AP due to the inertia of the deceleration. Thereby, the collision avoidance controller 66 prevents the executed collision avoidance function from ending by the operation of the accelerator pedal AP caused by the inertia of the deceleration by the braking after the start of the avoidance braking.

Thus, when the stroke of the accelerator pedal AP detected by the accelerator pedal stroke sensor 44 exceeds a third threshold, as the maximum stroke value caused by the inertia of the deceleration, before the threshold time T1 elapses from the start of the avoidance braking, the collision avoidance controller 66 ends the execution of the collision avoidance function (alarm, notification, or avoidance braking). That is, in this case, the collision avoidance controller 66 transmits an execution end command to the alarm controller 62, the notification controller 63, and the avoidance braking controller 64.

The third threshold is a threshold for determining an accidental step-on to the accelerator pedal AP. The third threshold should not be limited as long as it is equal to or greater than the maximum stroke value caused by the inertia of the deceleration. The maximum stroke value caused by the inertia of the deceleration is measured in advance and set and stored as the third threshold in the storage 65. In the present embodiment, the third threshold is set to 80% of the stroke for the full throttle acceleration (maximum stroke of the accelerator pedal AP=100%). The third threshold is, however, not limited to this value.

Figure 5:
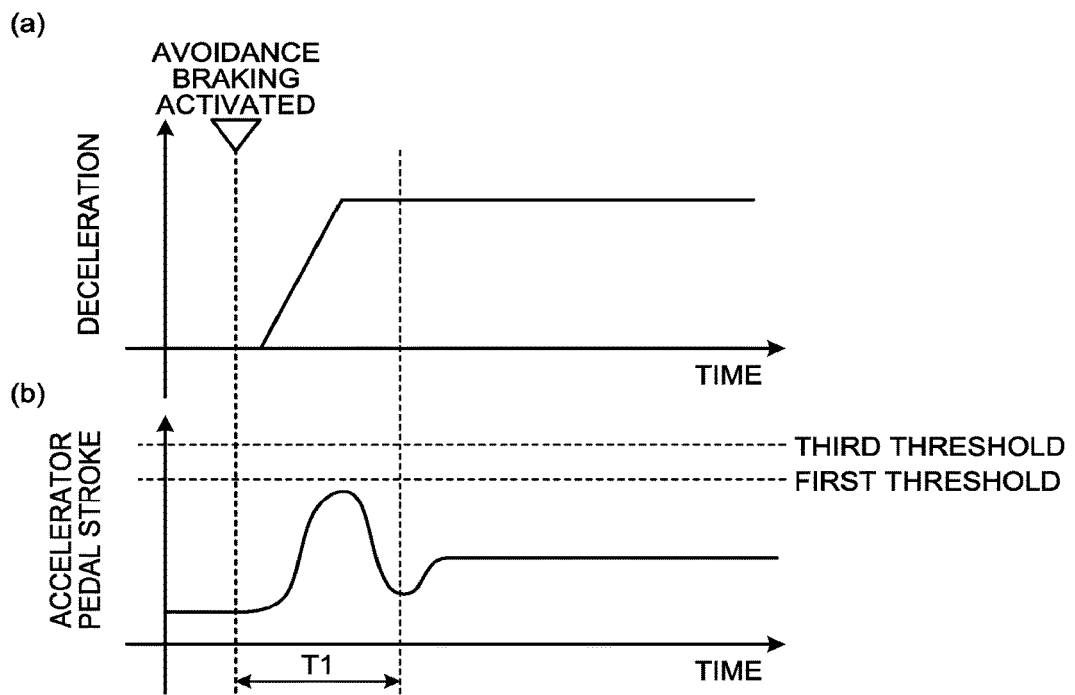
FIG. 5 depicts diagrams illustrating an example of temporal changes in deceleration and accelerator pedal stroke from after avoidance braking has started in the embodiment.

FIG. 5 depicts diagrams illustrating an example of temporal changes in deceleration and accelerator pedal stroke from the start of the avoidance braking in the present embodiment. Horizontal axes in FIG. 5 represent time. The graph of FIG. 5(a) illustrates a temporal change in deceleration from the start of the avoidance braking, and the graph of FIG. 5(b) illustrates a temporal change in accelerator pedal stroke from the start of the avoidance braking.

As illustrated in the graph of FIG. 5(a), the threshold time T1 denotes the time taken for gradually increasing deceleration to reach and maintain a certain value of deceleration G from the start of the avoidance braking (in rising state). As illustrated in the graph of FIG. 5(b), the accelerator pedal AP is depressed by the inertia caused by the deceleration before the threshold time T1 elapses. The collision avoidance controller 66 does not, however, end (cancel) the execution of the collision avoidance function unless the stroke exceeds the third threshold.

The determiner 61 determines, based on the operation of the accelerator pedal AP by the driver, whether the driver clearly intends to cancel the collision avoidance function. Specifically, the determiner 61 receives, from the accelerator pedal stroke sensor 44, the stroke of the accelerator pedal AP detected by the accelerator pedal stroke sensor 44. When determining that the stroke of the accelerator pedal AP is equal to or greater than a second threshold, when two or more depressions of the accelerator pedal AP is detected within a certain period of time, or when the speed of depression of the accelerator pedal AP is equal to or greater than a certain speed threshold, the determiner 61 determines that the driver clearly intends to cancel the collision avoidance function.

During the avoidance braking (automatic braking), when the determiner 61 determines the driver's clear intention to cancel the collision avoidance function, the collision avoidance controller 66 ends the execution of the collision avoidance function (alarm, notification, or avoidance braking). That is, in this case, the collision avoidance controller 66 transmits the execution end command to the alarm controller 62, the notification controller 63, and the avoidance braking controller 64.

After the elapse of the threshold time T1 from the star of the avoidance braking during which the accelerator pedal AP is additionally depressed due to the inertia caused by the deceleration by the avoidance braking, a large deceleration continues, therefore, it is difficult to detect the driver's intention of acceleration. Assume that no means for the cancelation is provided and no cancelation of the collision avoidance function is received through the operation of the accelerator pedal AP after the avoidance braking. Due to a failure or an erroneous recognition, however, the collision avoidance control may continue to maintain the avoidance braking, which makes it difficult to operate the vehicle, for example, to overtake a preceding vehicle for avoiding collision with the preceding vehicle or a following vehicle. For this reason, in the present embodiment, when determining, through the operation of the accelerator pedal AP, the driver's clear intention to cancel the collision avoidance function, the collision avoidance controller 66 ends the execution of the collision avoidance function (alarm, notification, or avoidance braking). Thereby, even in continuation of the collision avoidance function, the vehicle can be driven to overtake the preceding vehicle for avoiding collision with the preceding vehicle or the following vehicle.

Figure 6:
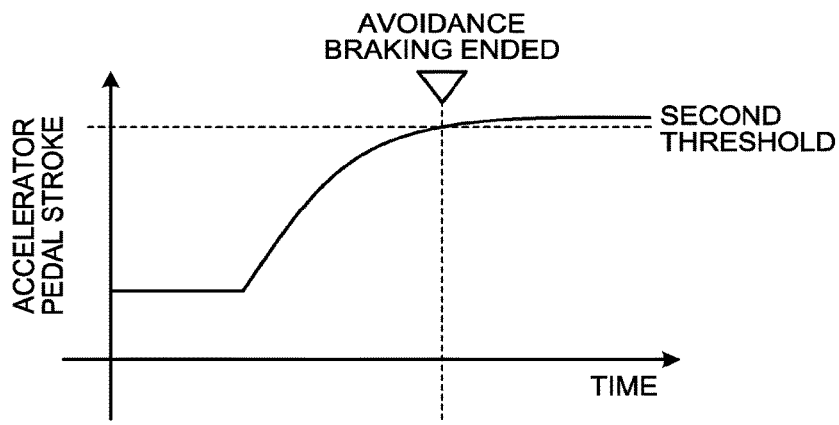
FIG. 6 is a diagram for explaining an example of a stroke of an accelerator pedal representing a clear intention of cancelation in the embodiment.

FIG. 6 is a diagram for explaining the clear intention of cancelation represented by the stroke of the accelerator pedal AP in the present embodiment. FIG. 6 illustrates the accelerator pedal stroke during the avoidance braking, where the horizontal axis represents time, and the vertical axis represents the accelerator pedal stroke.

As illustrated in FIG. 6, during the avoidance braking, at the time when the accelerator pedal stroke reaches or exceeds the second threshold by the driver's depressing the accelerator pedal, the determiner 61 determines the clear intention to cancel the avoidance braking, and the collision avoidance controller 66 ends the avoidance braking. Since the second threshold is a reference for determining the clear intention of cancelation, the second threshold can be set to a sufficiently large value. In the present embodiment, the second threshold is set to the stroke for the full throttle acceleration (maximum stroke of the accelerator pedal AP=100%).

Thus, the second threshold is set to the operation amount (stroke) of the accelerator pedal AP which is beyond the amount by a normal operation of the driver during the deceleration control through the avoidance braking However, the second threshold may be set to a value other than the maximum stroke of 100%, taking into consideration the behavior of the vehicle 100 after the braking cancellation, for example. As for the first threshold, under the condition in which the engine of the vehicle has low driving torque or the vehicle is placed in a gear with a small reduction ratio, the operation amount of the accelerator pedal AP by the driver is large during acceleration. Therefore, the first threshold is set to a relatively greater value than that under conditions other than the above-described condition.

Moreover, as for the third threshold, under the condition such as a small change in deceleration caused by the collision avoidance, a large reaction force to the accelerator pedal AP, or a large stroke amount of the accelerator pedal AP from the fully closed throttle position to the full throttle position, the accelerator position (the stroke of the accelerator pedal AP) of an erroneously operated accelerator pedal is small. Therefore, the third threshold is set to be a relatively smaller value than that under conditions other than the above-described condition.

Consequently, depending on the condition, the relation of magnitude between the first threshold and the third threshold can be such that the third threshold≤the first threshold, unlike the present embodiment. The execution of the collision avoidance function can be ended according to the second threshold over the entire range after start of the deceleration control by the avoidance braking. Hence, the second threshold and the third threshold are preferably set such that the second threshold>the third threshold. However, even with the second threshold and the third threshold set to satisfy the second threshold≤the third threshold, the execution of the collision avoidance function can be ended outside the threshold time T1 according to the second threshold.

Figure 7:
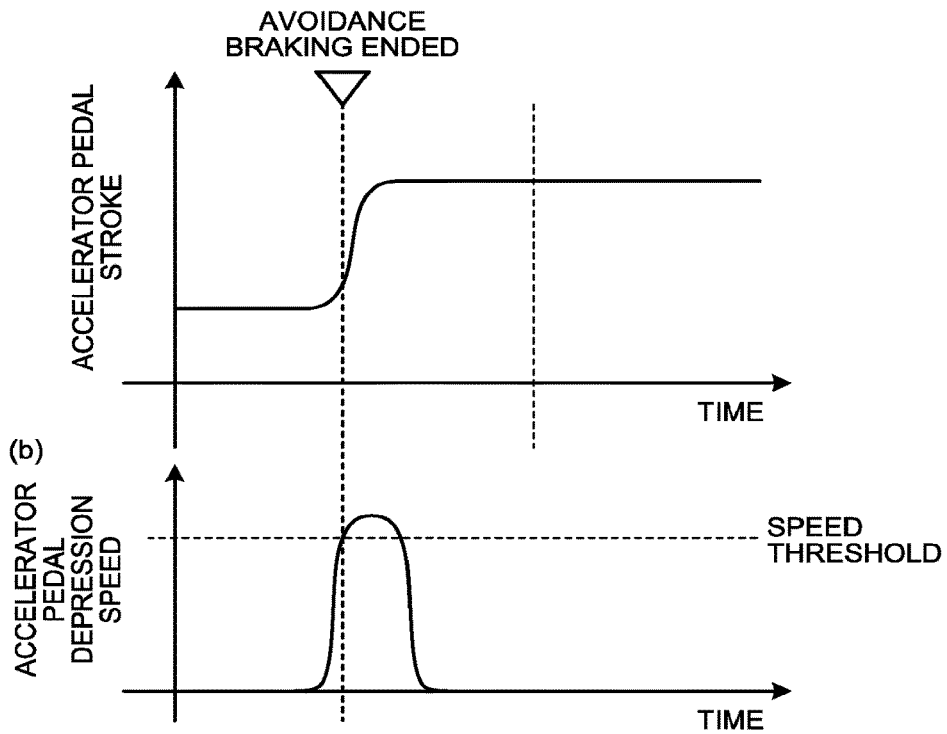
FIG. 7 depicts diagrams for explaining an example of a speed of depression of the accelerator pedal representing the clear intention of cancelation in the embodiment.

FIG. 7 depicts diagrams for explaining the clear intention of cancelation represented by the depression speed of the accelerator pedal AP in the present embodiment. FIG. 7 illustrates the accelerator pedal stroke and the accelerator pedal depression speed during the avoidance braking. The graph of FIG. 7(a) illustrates a temporal change in accelerator pedal stroke, and the graph of FIG. 7(b) illustrates a temporal change in accelerator pedal depression speed. In the present embodiment, during the avoidance braking, at the time when the change rate of the accelerator pedal stroke reaches or exceeds a certain gradient as illustrated in the graph of FIG. 7(a), or when the accelerator pedal depression speed reaches or exceeds the certain speed threshold as illustrated in the graph of FIG. 7(b), the determiner 61 determines the driver's clear intention to cancel the collision avoidance function, and the collision avoidance controller 66 ends the execution of the avoidance braking. The accelerator pedal depression speed is calculated from the change amount in the stroke of the accelerator pedal AP.

Figure 8:
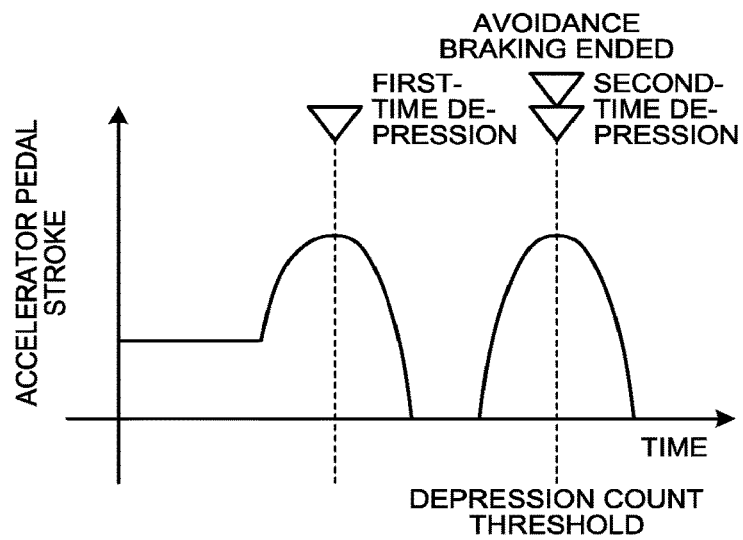
FIG. 8 is a diagram for explaining an example of the number of depressions of the accelerator pedal representing the clear intention of cancelation in the embodiment.

FIG. 8 is a diagram for explaining the clear intention of cancelation represented by the number of depressions of the accelerator pedal AP in the present embodiment. FIG. 8 illustrates the stroke of the accelerator pedal AP during the avoidance braking, where the horizontal axis represents time, and the vertical axis represents the accelerator pedal stroke. A detection signal is received from the accelerator pedal stroke sensor 44. When the stroke represented by the detection signal is greater than zero, the operation of the accelerator pedal AP is determined and counted as one depression.

As illustrated in FIG. 8, when the driver depresses the accelerator pedal AP twice which is a depression count threshold during the avoidance braking, the determiner 61 determines, upon detecting a second-time depression, the clear intention to cancel the avoidance braking, and the collision avoidance controller 66 ends the avoidance braking. Although the depression count threshold is set to two in the example of FIG. 8, the depression count threshold can be set to three or more. Alternatively, the depression count threshold can be set to one under a combination of the condition for determining the clear intention of cancelation with a condition for limiting the detection period or state such as continuation of the stroke of the accelerator pedal AP at 0% for a certain time or longer or the elapse of a certain time from the avoidance braking. Furthermore, to set the depression count threshold to one, the condition for limiting the detection period or state may additionally include no depression of the brake pedal BP and operation of the steering wheel.

In the present embodiment, the clear intention of cancelation is determined in the three situations, that is, that the stroke of the accelerator pedal AP is equal to or greater than the second threshold, that two or more depressions of the accelerator pedal AP are detected within the certain period of time, and that the depression speed of the accelerator pedal AP is equal to or greater than the speed threshold. The present embodiment is, however, not limited to these three situations.

The determiner 61 determines, with reference to the execution flag of the acceleration limiting function in the storage 65, whether the brake ECU 12 is executing the acceleration limiting function. During the execution of the acceleration limiting function, the collision avoidance controller 66 controls the relevant controllers so as not to inhibit or end the execution of the collision avoidance function, regardless of the operation of the accelerator pedal AP detected by the accelerator pedal stroke sensor 44, that is, even when detecting the operation of the accelerator pedal AP indicating the clear intention of acceleration or cancelation thereof.

During the control of the acceleration limiting function for limiting the speed and the acceleration of the vehicle 100, the operation of the accelerator pedal AP is not consistent with the speed and the acceleration of the vehicle 100, and the driver may differently operate the accelerator pedal AP from a normal operation. In other words, during the control of the acceleration limiting function, even when stepping on the accelerator pedal AP, the driver does not feel acceleration, which makes it difficult to determine the clear intention of acceleration of the driver from the stroke of the accelerator pedal AP. Because of this, the present embodiment refrains from inhibiting or ending the collision avoidance function during the control of the acceleration limiting function, even when detecting the operation of the accelerator pedal AP. Thereby, erroneous determination on the inhibition or ending of the collision avoidance function is prevented.

Figure 9:
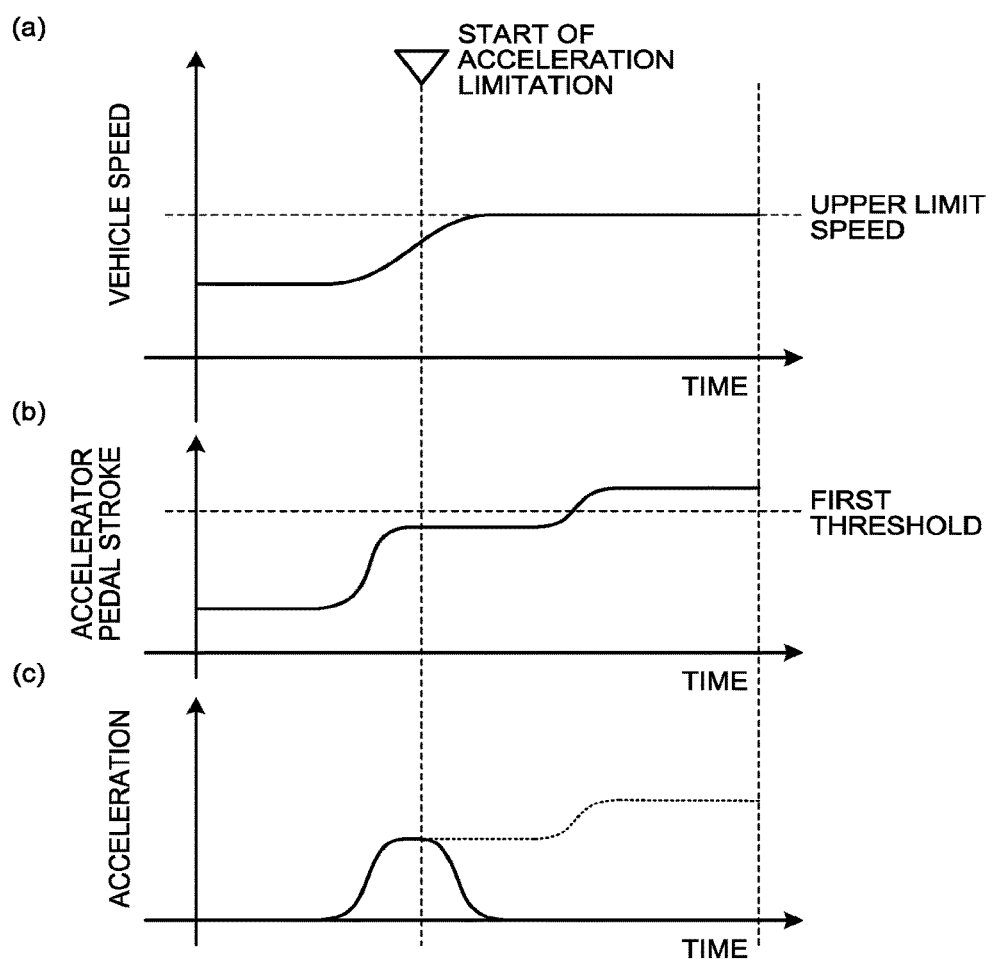
FIG. 9 depicts diagrams illustrating an example of temporal changes in vehicle speed, accelerator pedal stroke, and acceleration of a vehicle during control of an acceleration limiting function according to the embodiment.

FIG. 9 depicts diagrams illustrating temporal changes in vehicle speed, accelerator pedal stroke, and acceleration of the vehicle during the control of the acceleration limiting function according to the present embodiment. FIG. 9(a) illustrates a temporal change in speed of the vehicle. FIG. 9(b) illustrates a temporal change in accelerator pedal stroke of the vehicle. FIG. 9(c) illustrates a temporal change in acceleration of the vehicle.

As illustrated in FIGS. 9(a) and 9(b), upon start of the acceleration limiting function, the vehicle speed is limited to the upper limit speed even with an increase in the stroke of the accelerator pedal AP. Along with an increase in the stroke of the accelerator pedal AP, the acceleration of the vehicle 100 increases under normal circumstances as indicated by the dotted line in FIG. 9(c). However, after the start of the limiting function, the acceleration decreases as indicated by the solid line in FIG. 9(c). Thus, even the stroke of the accelerator pedal AP being the first threshold or above cannot be determined as the clear intention of acceleration since the vehicle body speed and the acceleration are limited.

The determiner 61 receives the brake operation signal from the brake switch 42 to determine whether the brake pedal BP is operated from ON or OFF of the brake operation signal. The determiner 61 receives the detection signal from the accelerator pedal stroke sensor 44 to determine that the accelerator pedal AP is operated, when the stroke represented by the detection signal is greater than zero, as described above.

When the determiner 61 determines simultaneous operations of the brake pedal BP and the accelerator pedal AP, the collision avoidance controller 66 controls the relevant controllers so as not to inhibit or end the execution of the collision avoidance function, regardless of the operation of the accelerator pedal AP detected by the accelerator pedal stroke sensor 44.

The depression of both the accelerator pedal AP and the brake pedal BP generally signifies an unusual situation that the driver accidentally touches the accelerator pedal AP while depressing the brake pedal BP. In such an unusual situation, to give higher priority to deceleration than to acceleration, the execution of the collision avoidance function is not inhibited or ended by the operation of the accelerator pedal AP by the driver.

Figure 10:
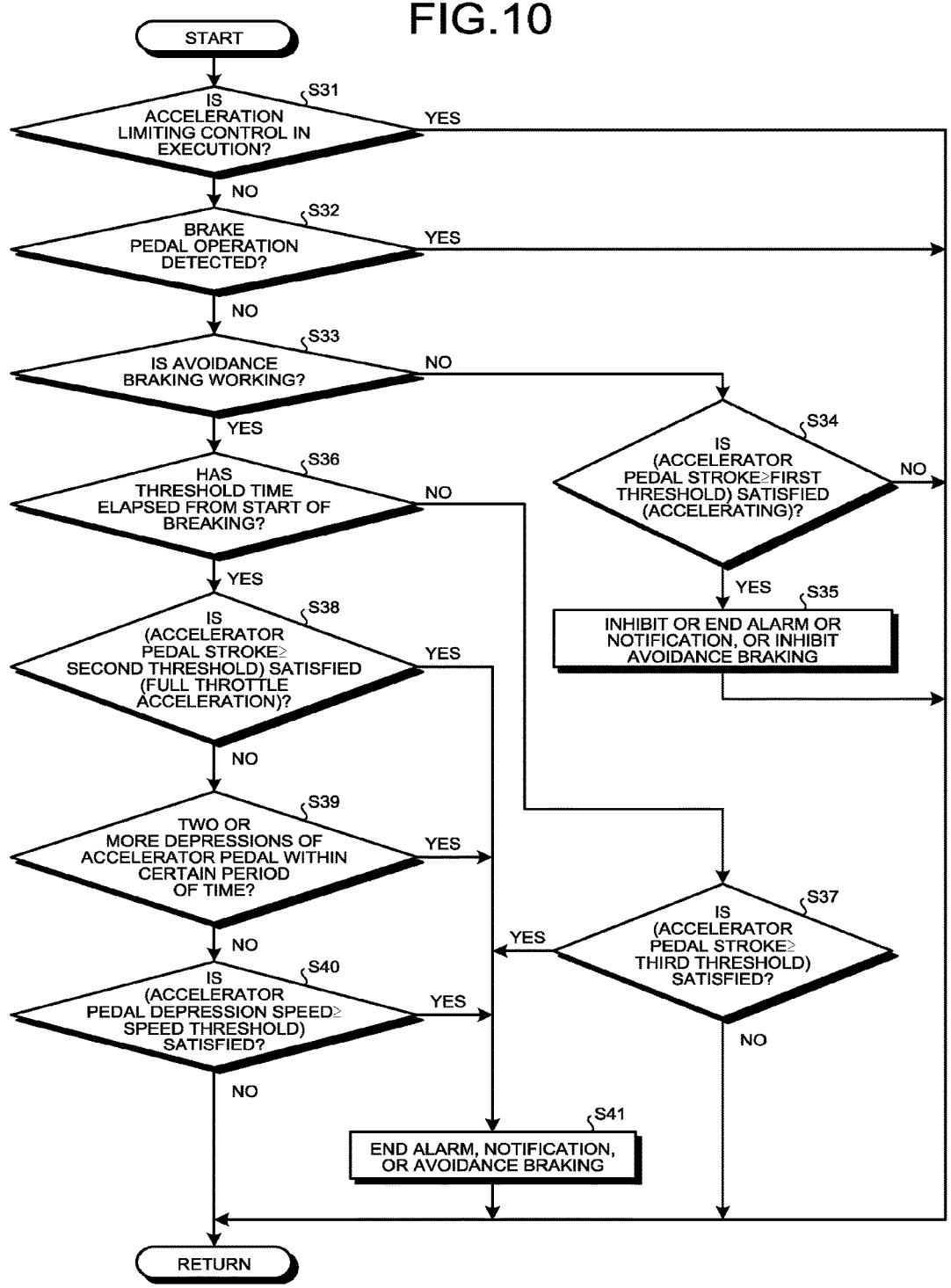
FIG. 10 is a flowchart of an exemplary procedure of inhibition or ending determination on execution of the collision avoidance function according to the embodiment.

The following describes a flow of such an inhibition or ending determination on the execution of the collision avoidance function (S19 of FIG. 3) according to the present embodiment. FIG. 10 is a flowchart of an exemplary procedure of the inhibition or ending determination on the execution of the collision avoidance function according to the present embodiment. The process in FIG. 10 is executed individually when the avoidance braking is activated at S13 of FIG. 3, when the notification is issued at S15 of FIG. 3, and when the alarm is issued at S17 of FIG. 3.

First, the determiner 61 determines, with reference to the execution flag of the acceleration limiting function in the storage 65, whether the acceleration limiting function is being executed by, for example, the brake ECU 12 (S31). When determining that the acceleration limiting function is being executed (Yes at S31), the determiner 61 ends the process. As a result, the collision avoidance function is not inhibited or ended, regardless of the operation of the accelerator pedal AP.

When determining that the acceleration limiting function is not being executed (No at S31), the determiner 61 determines whether the brake operation signal output from the brake switch 42 is ON to thereby determine detection or non-detection of the operation of the brake pedal BP (S32). When detecting the operation of the brake pedal BP, (Yes at S32), the determiner 61 ends the process. Thereby, the execution of the collision avoidance function is not inhibited or ended, which means that the operation of the brake pedal BP is given a higher priority than that of the driver's operation of the accelerator pedal AP.

When detecting no operation of the brake pedal BP (No at S32), the determiner 61 determines, with reference to the flag in the storage 65, whether the avoidance braking (automatic braking) is working (S33). When determining that avoidance braking is not working (No at S33), the determiner 61 determines, based on the detection signal from the accelerator pedal stroke sensor 44, whether the stroke of the accelerator pedal AP is equal to or greater than the first threshold (that is, whether the vehicle is accelerating) (S34).

When determining that the avoidance braking is not working and the stroke of the accelerator pedal AP is the first threshold or above (Yes at S34), the determiner 61 determines that the driver clearly intends to accelerate, and the collision avoidance controller 66 ends the alarm or the notification if they are issued, or inhibits the issuance of the alarm or the notification if they are not issued. The collision avoidance controller 66 inhibits the activation of the avoidance braking (S35). Then, the process ends.

If, at S34, the stroke of the accelerator pedal AP is smaller than the first threshold (No at S34), the process ends. As a result, the execution of the collision avoidance function is not inhibited.

At S33, determining that the avoidance braking is working (Yes at S33), the determiner 61 determines whether the threshold time T1 has elapsed from the start of the avoidance braking, that is, whether the deceleration has stopped rising (S36). When determining no elapse of the threshold time T1 from the start of the avoidance braking or non-stop of rising of the deceleration (No at S36), the determiner 61 determines, from the detection signal from the accelerator pedal stroke sensor 44, whether the stroke of the accelerator pedal AP is equal to or greater than the third threshold (that is, whether it exceeds the stroke caused by the inertia of the deceleration) (S37).

With the stroke of the accelerator pedal AP being the third threshold or above (Yes at S37), the collision avoidance controller 66 ends the alarm or the notification, or the avoidance braking (S41).

If at S37 the stroke of the accelerator pedal AP is smaller than the third threshold (No at S37), the process ends. As a result, the collision avoidance function is not ended.

At S36, when determining the elapse of the threshold time T1 from the start of the avoidance braking, that is, stop of rising of the deceleration (Yes at S36), the determiner 61 determines whether the stroke of the accelerator pedal AP is equal to or greater than the second threshold (that is, whether the vehicle is accelerating at a full throttle) (S38). Upon determining the stroke of the accelerator pedal AP as equal to or greater than the second threshold (Yes at S38), the determiner 61 determines the driver's clear intention to cancel the collision avoidance function, and the collision avoidance controller 66 ends the alarm or the notification, or the avoidance braking (S41).

With the stroke of the accelerator pedal AP being smaller than the second threshold (No at S38), the determiner 61 determines, based on the detection signals from the accelerator pedal stroke sensor 44, whether the accelerator pedal AP has been depressed two or more times within the certain period of time (S39). Upon determining two or more depressions of the accelerator pedal AP within the certain period of time (Yes at S39), the determiner 61 determines that the driver clearly intends to cancel the execution of the collision avoidance function, and the collision avoidance controller 66 ends the alarm, the notification, or the avoidance braking (S41).

When determining that the accelerator pedal AP has not been depressed two or more times within the certain period of time (No at S39), the determiner 61 determines, from the detection signal from the accelerator pedal stroke sensor 44, whether the depression speed of the accelerator pedal AP is equal to or greater than the speed threshold (S40). When determining the depression speed of the accelerator pedal AP as equal to or greater than the speed threshold (Yes at S40), the determiner 61 determines the driver's clear intention to cancel the execution of the collision avoidance function, and the collision avoidance controller 66 ends the alarm, the notification, or the avoidance braking (S41).

If the depression speed of the accelerator pedal AP is smaller than the speed threshold (No at S40), the process ends. As a result, the collision avoidance function is not ended.

Thus, in the present embodiment, during no execution of the avoidance braking (automatic braking), when the determiner 61 determines, based on the operation of the accelerator pedal AP by the driver, the driver's clear intention to accelerate, the collision avoidance controller 66 controls the respective controllers to inhibit the activation of the collision avoidance function (alarm, notification, or avoidance braking). As a result, in the present embodiment, for example, the vehicle equipped with the collision avoidance function can travel according to or reflecting the driver's intention, that is, can overtake or slip by the preceding vehicle.

In the present embodiment, the collision avoidance controller 66 does not end the collision avoidance function from the start of the avoidance braking to the stop of rising of the deceleration. Because of this, even when the inertia by the deceleration of the vehicle 100 by the avoidance braking causes the driver to additionally step on the accelerator pedal AP by accident, the collision avoidance function is not ended, and thus, the collision avoidance function can be securely executed.

In the present embodiment, when the stroke of the accelerator pedal AP detected by the accelerator pedal stroke sensor 44 exceeds the maximum stroke value due to the inertia of the deceleration before the stop of deceleration rising (before the elapse of the threshold time T1) after the start of the avoidance braking, the collision avoidance controller 66 ends the execution of the collision avoidance function (alarm, notification, or avoidance braking). As a result, according to the present embodiment, the driver can intentionally end the collision avoidance function, for example, even before the rising of the deceleration after the start of the avoidance braking.

In the present embodiment, during the avoidance braking, when the determiner 61 determines, from the operation of the accelerator pedal AP, the driver's clear intention to cancel the collision avoidance function, the collision avoidance controller 66 ends the execution of the collision avoidance function (alarm, notification, or avoidance braking). As a result, the present embodiment enables the vehicle to run as the driver intends, for example, to overtake the preceding vehicle for avoiding the collision with the preceding vehicle or the following vehicle even during the continuation of the avoidance braking.

In the present embodiment, during the control of the executed acceleration limiting function for limiting the speed and the acceleration of the vehicle 100, the execution of the collision avoidance function is not inhibited or ended even upon detection of the operation of the accelerator pedal AP. As a result, the present embodiment can prevent, for example, erroneous determination on the inhibition or ending of the collision avoidance function.

In the present embodiment, when determining simultaneous operations of the brake pedal BP and the accelerator pedal AP, the relevant controllers do not inhibit or end the collision avoidance function regardless of the operation of the accelerator pedal AP. As a result, according to the present embodiment, for example, in the unusual situation that both the accelerator pedal AP and the brake pedal BP are depressed, the collision avoidance function is not inhibited or ended by the driver's operation of the accelerator pedal AP, which can prioritize the deceleration over the acceleration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATIONS OF LETTERS OR NUMERALS

12 Brake electronic control unit (ECU)
13 Engine ECU
20 Engine
30 Brake controller
40 Control device
41 (41*fr*, 41*fl*, 41*rr*, and 41*rl*) Wheel speed sensors
42 Brake switch
43 Front-rear directional acceleration sensor
44 Accelerator pedal stroke sensor
60 Collision avoidance ECU
61 Determiner
62 Alarm controller
63 Notification controller
64 Avoidance braking controller
65 Storage
66 Collision avoidance controller
100 Vehicle

The invention claimed is:

1. A collision avoidance device comprising:
a collision avoidance executor that can execute a collision avoidance function for a vehicle to avoid collision with an object to be avoided;
a determiner that determines, based on an operation of an accelerator pedal by a driver, whether the driver has an intention of acceleration; and
a collision avoidance controller that inhibits execution of the collision avoidance function when the driver is determined to have the intention of acceleration, wherein
the determiner further determines, based on the operation of the accelerator pedal, whether the driver has an intention of cancelation of the collision avoidance function, and
the collision avoidance controller ends the execution of the collision avoidance function when the driver is determined to have the intention of cancelation during the execution of the collision avoidance function.

2. The collision avoidance device according to claim 1, wherein the determiner determines that the driver has the intention of acceleration, when a stroke of the accelerator pedal is equal to or greater than a first threshold.

3. The collision avoidance device according to claim 1, wherein the determiner determines that the driver has the intention of cancelation when the stroke of the accelerator is equal to or greater than a second threshold, when two or more depressions are detected within a certain period of time, or when a depression speed of the accelerator pedal is equal to or greater than a speed threshold.

4. The collision avoidance device according to claim 1, wherein the collision avoidance controller refrains from ending the execution of the collision avoidance function from a start of the execution of the collision avoidance function to a stop of rising of a deceleration.

5. The collision avoidance device according to claim 4, wherein the collision avoidance controller ends the execution of the collision avoidance function when the stroke of the accelerator pedal batches or exceeds a third threshold from the start of the execution of the collision avoidance function to the stop of the rising of the deceleration, the third threshold being for determining an accidental depression of the accelerator pedal.

6. The collision avoidance device according to claim 1, wherein the collision avoidance controller refrains from inhibiting or ending the execution of the collision avoidance function during execution of an acceleration limiting function, regardless of the operation of the accelerator pedal, the acceleration limiting function being for limiting a vehicle speed to a certain upper limit speed or below or limiting a vehicle acceleration to a certain upper limit acceleration or below.

7. The collision avoidance device according to claim 1, wherein the collision avoidance controller refrains from inhibiting or ending the execution of the collision avoidance function regardless of the operation of the accelerator pedal, when simultaneous operations of a brake pedal and the accelerator pedal are detected.

* * * * *